United States Patent
Lidian et al.

(10) Patent No.: US 10,367,559 B2
(45) Date of Patent: Jul. 30, 2019

(54) NETWORK NODE, NETWORK DEVICE AND METHOD FOR REDUCING A HIGHER LAYER SIGNALING OVERHEAD

(71) Applicant: TELEFONAKTIEBOLAGET LM ERICSSON (PUBL), Stockholm (SE)

(72) Inventors: Namir Lidian, Solna (SE); SaiRamesh Nammi, Austin, TX (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/777,343

(22) PCT Filed: Apr. 19, 2016

(86) PCT No.: PCT/SE2016/050336
§ 371 (c)(1),
(2) Date: May 18, 2018

(87) PCT Pub. No.: WO2017/099646
PCT Pub. Date: Jun. 15, 2017

(65) Prior Publication Data
US 2018/0331736 A1  Nov. 15, 2018

Related U.S. Application Data

(60) Provisional application No. 62/264,972, filed on Dec. 9, 2015.

(51) Int. Cl.
*H04B 7/0456* (2017.01)
*H04L 25/03* (2006.01)
(Continued)

(52) U.S. Cl.
CPC ......... *H04B 7/0478* (2013.01); *H04B 7/0486* (2013.01); *H04B 7/0626* (2013.01); *H04B 7/2603* (2013.01); *H04L 25/03923* (2013.01)

(58) Field of Classification Search
CPC .. H04B 7/0413; H04B 7/0478; H04B 7/0486; H04B 7/0619; H04B 7/0697
(Continued)

(56) References Cited

U.S. PATENT DOCUMENTS

2010/0041384 A1* 2/2010 Kazmi .................. H04W 48/16
455/419
2013/0272250 A1  10/2013 Shimezawa et al.
(Continued)

FOREIGN PATENT DOCUMENTS

WO   WO 2014027949 A2 *  2/2014  ........... H04B 7/0413

OTHER PUBLICATIONS

Ericsson, "Codebook Subset Restriction in Four Branch MIMO System", 3GPP Draft, R1-124503, Oct. 8-12, 2012, vol. RAN WG1, No. 70bis, retrieved from the Internet: URL:http://www.3gpp.org/ftp/tsg_ran/WG1_RL1/TSGR1_70b/Docs/.
(Continued)

*Primary Examiner* — Kevin M Burd
(74) *Attorney, Agent, or Firm* — Sage Patent Group (57) ABSTRACT

Embodiments herein relate to a method, performed by a network node, for reducing a higher layer signaling overhead in multi antenna wireless communication systems. The network node operates in a communication network, which communication network is adapted to wirelessly serve a network device via a Radio Access, RA, node. The network node obtains information from the network device, which information comprises a category of the network device and a number of layers supported by the network device. The network node determines a length of a codebook subset restriction based on the information obtained from the network device. The network node further sends a codebook subset restriction bit map to the network device, according to the determined length of the codebook subset restriction.

16 Claims, 5 Drawing Sheets (51) Int. Cl.
*H04B 7/06* (2006.01)
*H04B 7/26* (2006.01)

(58) Field of Classification Search
USPC .......................................................... 375/262
See application file for complete search history.

(56) References Cited

U.S. PATENT DOCUMENTS

2014/0205031 A1* 7/2014 Nammi ................ H04B 7/0413
375/267
2016/0007212 A1* 1/2016 Kim ..................... H04B 7/0452
370/254

OTHER PUBLICATIONS

Samsung, "Further details on UE-specific codebook subset restriction", 3GPP Draft, R1-105381, Oct. 11-15, 2010, vol. RAN WG1, No. 62bis.

* cited by examiner

NETWORK NODE, NETWORK DEVICE AND METHOD FOR REDUCING A HIGHER LAYER SIGNALING OVERHEAD

TECHNICAL FIELD

Embodiments herein relate to a network node, a network device and methods therein. In particular, it relates to a method for reducing a higher layer signaling overhead in multi antenna wireless communication systems.

BACKGROUND

Communication devices such as User Equipment (UEs) are enabled to communicate wirelessly in a cellular communications network or wireless communication system, sometimes also referred to as a cellular radio system or cellular networks. The communication may be performed e.g. between two UEs, between a UE and a regular telephone and/or between a UE and a server via a Radio Access Network (RAN) and possibly one or more core networks, comprised within the cellular communications network. Communication devices may herein also be referred to as network devices. UEs may further be referred to as wireless terminals, mobile terminals and/or mobile stations, mobile telephones, cellular telephones, laptops, tablet computers or surf plates with wireless capability. The UEs in the present context may be, for example, portable, pocket-storable, hand-held, computer-comprised, or vehicle-mounted mobile devices, enabled to communicate voice and/or data, via the RAN, with another entity, such as another wireless terminal or a server.

In some embodiments herein, the non-limiting term network device is used and it may refer to any type of wireless device communicating with a radio network node in a cellular or mobile communication system, such as e.g. an User Equipment (UE). Examples of UEs are target device, device to device (D2D) UE, machine type UE or UE capable of machine to machine (M2M) communication, PDA, iPAD, Tablet, mobile terminals, smart phone, laptop embedded equipped (LEE), laptop mounted equipment (LME), USB dongles etc.

The communications network covers a geographical area which is divided into cells, wherein each cell is being served by one or more transmission points. A cell is a geographical area where radio coverage is provided by a transmission point. One or more cells may also have an overlapping cell area.

A network node may control one or more Radio Access (RA) nodes comprising one or more transmission points, e.g. having Radio Units (RRUs). A RA node may thus control one or more transmission/reception points. A transmission point, also referred to as a transmission/reception point, is an entity that transmits and/or receives radio signals. The entity has a position in space, e.g. an antenna. A network node is an entity that controls one or more transmission points. The transmission point may e.g. be a Radio Base Station (RBS), eNB, eNodeB, NodeB, B node, Base Transceiver Station (BTS), Radio Access (RA) node. The network node may e.g. also be a base station such as a Radio Base Station (RBS), eNB, eNodeB, NodeB, B node, Base Transceiver Station (BTS), Radio Access (RA) node, depending on the technology and terminology used. The network node could however also be a distributed node comprised in a cloud and being configured to control the transmission point from a distance. In some embodiments herein, the non-limiting term radio network node or simply network node is used and it may refer to any type of network node serving a UE and/or connected to another network node or a network element or any radio node from where a UE receives signals. Examples of radio network nodes may e.g. be Node B, base station (BS), multi-standard radio (MSR) radio node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

The base stations may be of different classes such as e.g. macro eNodeB, home eNodeB or pico base station, based on transmission power and thereby also cell size.

Further, each network node may support one or several communication technologies. The network nodes communicate over the air interface operating on radio frequencies with the UEs within range of the network node. In the context of this disclosure, the expression Downlink (DL) is used for the transmission path from the base station to the mobile station. The expression Uplink (UL) is used for the transmission path in the opposite direction, i.e. from the UE to the base station.

In 3rd Generation Partnership Project (3GPP) Long Term Evolution (LTE), base stations, which may be referred to as eNodeBs or even eNBs, may be directly connected to one or more core networks. In LTE the cellular communication network is also referred to as Evolved Universal Terrestrial Radio Access Network (E-UTRAN).

Multiple Input Multiple Output (MIMO), is an advanced antenna technique to improve the spectral efficiency and thereby boosting the overall system capacity. The MIMO technique uses a commonly known notation (M×N) to represent MIMO configuration in terms of the number of transmit (M) and receive antennas (N). The common MIMO configurations used or currently standardized for various technologies are: (2×1), (1×2), (2×2), (4×2), (4×4), (8×2), (8×4) and (8×8). The configurations represented by (2×1) and (1×2) are special cases of MIMO and they correspond to transmit diversity and receiver diversity respectively. Current LTE and HSPA standards support the use of a 1-dimensional array of co- or cross-polarized antenna ports. Under development in 3GPP is a standard support for 2-dimensional antenna ports, where antenna ports are located in both vertical and horizontal dimensions. In future systems the support for antenna ports may be drastically increased.

Multiple antennas employed at the transmitter and receiver may significantly increase the system capacity. By transmitting independent symbol streams in the same frequency bandwidth, which may also be referred to as Spatial Multiplexing (SM), a linear increase in data rates with the increased number of antennas may be achieved. Further, by using space-time codes at the transmitter, reliability of the detected symbols may be improved by exploiting the so called transmit diversity. Both these schemes assume no channel knowledge at the transmitter, such as e.g. a network node.

SUMMARY

It is therefore an object of embodiments herein to improve a system capacity by reducing the signaling overhead in a MIMO system.

The embodiments herein disclose a method for sending the codebook subset restriction bit map based on an network device category and a network device capability. The network node may thereby send the variable length codebook subset restriction based on the number of layers supported by each network device in the network. Thereby, the signaling overhead may be reduced.

According to a first aspect of embodiments herein, the object may be achieved by a method, performed by a network node, for reducing a higher layer signaling overhead in multi antenna wireless communication systems. The network node operates in a communication network, which network is adapted to wirelessly serve a network device via a Radio Access (RA) node. The network node obtains information from a network device, such as e.g. a UE, about the network device's category and a number of layers supported by the network device. The network node may further determine a length of a codebook subset restriction based on the information obtained from the network device. The network node sends a codebook subset restriction bit map to the network device, according to the determined length of the codebook subset restriction.

According to a second aspect of embodiments herein, the object is achieved by a method, performed by a network device, for reducing a higher layer signaling overhead in multi antenna wireless communication systems. The network device operates in a communication network, which network is adapted to wirelessly serve the network device via a Radio Access (RA) node. The network device sends a message to the network node comprising information about the network device's category and the number of layers supported by the network device. The network device further receives a codebook subset restriction bit map from the network node. The network device applies, which may also be referred to as configures itself using, the precoding codebook elements for CSI reporting according to the codebook subset restriction bit map received from the network node.

According to a third aspect of embodiments herein, the object is achieved by a network node configured to perform a method for reducing a higher layer signaling overhead in multi antenna wireless communication systems. The network node operates in a communication network, which network is adapted to wirelessly serve a network device, such as e.g. a User Equipment (UE), via a Radio Access (RA) node. The network node is configured to obtain information from a network device, such as e.g. a UE, about the network device's category and a number of layers supported by the network device. The network node is further configured to determine a length of a codebook subset restriction based on the information obtained from the network device. The network node is further configured to send a codebook subset restriction bit map to the network device according to the determined length of the codebook subset restriction.

According to a fourth aspect of embodiments herein, the object may be achieved by a network device being configured to perform a method for reducing a higher layer signaling overhead in multi antenna wireless communication systems. The network device operates in a communication network, which network is adapted to wirelessly serve the network device via a Radio Access (RA) node. The network device is configured to send a message to the network node comprising information about the network device's category and the number of layers supported by the network device. The network device is further configured to receive a codebook subset restriction bit map from the network node. The network device is further configured to apply, which may also be referred to as configure itself using, the precoding codebook elements for CSI reporting according to the codebook subset restriction bit map received from the network node.

The embodiments disclosed herein have the advantage that signaling overhead from the upper layers (RRC) may be reduced, thereby improving the throughput of a data traffic channel due to the less overhead for the RRC signaling.

A further advantage with the embodiments herein is that RRC signaling message failures and the latency of the system may be reduced.

Furthermore, the signaling between core network nodes, such as e.g. between two RNCs over a Iub interface, or between a core network node and a radio access node, such as a Node B or an eNode B over a Iur interface, may be reduced.

Thereby the capacity of the communications system may be improved.

Abbreviations

MIMO Multiple input multiple output
Tx Transmitter
HSDPA High Speed Downlink Packet Access
DCI Downlink control Index
HARQ Hybrid automatic repeat request
CRC Cyclic redundancy check
NAK non-acknowledgement
ACK acknowledgement
UE User Equipment
CQI Channel quality information
MMSE Minimum Mean Square Error
ML Maximum Likelihood
MAP Maximum Aposteriori Probability
TTI Transmit Time Interval
PCI Precoding control index
BS Base Station
D2D Device-to-Device
HD Half Duplex
M2M Machine-To-Machine
MTC Machine-Type Communication
UE User Equipment
eNB Evolved Node B, base station
E-UTRAN Evolved universal terrestrial radio access network
E-UTRA Evolved universal terrestrial radio access
E-UTRA FDD E-UTRA frequency division duplex
E-UTRA TDD E-UTRA time division duplex
LTE Long term evolution
RAT Radio Access Technology
RRC Radio resource control
TDD Time division duplex
BSC Base station Controller
HSPA High Speed Packet Access
GSM Global system for mobile communication
UTRA Universal terrestrial radio access
UTRA FDD UTRA frequency division duplex
UTRA TDD UTRA time division duplex
WLAN Wireless Local Area Network
GERAN GSM EDGE Radio Access Network
EDGE Enhanced Data rates for GSM Evolution
CDMA2000 Code division multiple access 2000
HRPD High rate packet data
DL Downlink
PDCCH Physical Downlink Control Channel
PCFICH Physical Control format Indicator
PDSCH Physical Downlink Shared Channel
PHICH Physical Hybrid ARQ Indicator Channel
RE Resource Element RB Resource Block
RS Reference signal
SINR Signal-to-Interference Ratio

BRIEF DESCRIPTION OF THE DRAWINGS

Examples of embodiments herein are described in more detail with reference to attached drawings in which.

DETAILED DESCRIPTION

In a practical wireless communications system such as the 3rd generation partnership project (3GPP) long term evolution (LTE), HSDPA and WiMAX and systems, the channel knowledge may be made available at the transmitter, such as the network node, via feedback from a receiver, such as a network device, to the transmitter. The MIMO transmitter may utilize this channel information to improve system performance with the aid of precoding. In addition to a beam forming gain, the use of precoding avoids a problem of ill-conditioned channel matrix.

In practice, complete Channel State Information (CSI) may be available for a communication system using the Time Division Duplex (TDD) scheme by exploiting channel reciprocity. However, for a Frequency Division Duplex (FDD) system, complete CSI may be more difficult to obtain. In a FDD system, some kind of CSI knowledge may be available at the transmitter, such as the network node, via feedback from the receiver, such as a network device. These systems may also be referred to as limited feedback systems. There are many implementations of limited feedback systems such as e.g. codebook based feedback and quantized channel feedback. For 3GPP LTE, HSDPA and WiMax codebook based feedback CSI are recommended for precoding. Examples of CSI are Channel Quality Indicator (CQI), PreCoding Index (PCI), Precoding Matrix Indicator (PMI), Rank Indicator (RI). One or a combination of different types of CSI may be used by the network node, which network node may e.g. be a NodeB in UTRA or an eNodeB in LTE, for one or more resource assignment related tasks such as scheduling data to a UE, rank adaptation of MIMO streams, precoder selection for MIMO stream etc. The rank of the MIMO streams is set by the network node independently of a request sent from the network device.

In codebook based precoding, a predefined codebook may be defined at both the transmitter and the receiver. The entries of a codebook may be constructed using different methods, such as for example Grassmannian, Llyod algorithm, DFT matrix etc. The precoder matrix may often be chosen to match the characteristics of the NR×NT MIMO channel matrix H, which results in a so-called channel dependent precoding. This may also be commonly referred to as closed-loop precoding and essentially strives for focusing the transmit energy into a subspace which is strong in the sense of conveying much of the transmitted energy to the network device. In addition, the precoder matrix may also be selected to strive for orthogonalizing the channel, meaning that after proper linear equalization at the network device, the inter-layer interference is reduced. At the receiver it is common to find the Signal-to-Interference-plus-Noise-Ratio (SINR) with different codebook entries and choose the Rank/precoding index which gives highest spectral efficiency, which may also be referred to as the capacity.

However, the network may choose to use only a limited number of the available precoding elements for a variety of reasons. This limited set of precoding elements then needs to be indicated to the UE. This may be referred to as a codebook subset restriction or also known as a precoding weight restriction.

Overview of Codebook Subset Restriction

In LTE: According to 3GPP standard TS E-UTRA Physical layer procedures 36.213 v12.7.0 and TS Physical layer procedures 25.214 v13.0.0, a network device, such as a UE, may be restricted to report PMI/PCI and RI/NTBP within a precoder codebook subset specified by a bitmap parameter. This bitmap parameter may in some embodiments be referred to as a codebookSubsetRestriction, and may be configured by higher layer signalling. For a specific precoder codebook and associated transmission modes, the bitmap may specify all possible precoder codebook subsets from which the UE may assume the eNB may be using when the UE is configured in the relevant transmission mode. In other words, the bitmap specifies the precoder codebook subsets that a network node, such as a radio access node, might use for communication with the network device, such as the UE. Codebook subset restriction is supported for open-loop spatial multiplexing, closed-loop spatial multiplexing, multi-user MIMO and closed-loop Rank=1 precoding. The resulting number of bits for each transmission mode are given in Table 1. The bitmap forms the bit sequence $a_{A_c-1}, \ldots, a_3, a_2, a_1, a_0$ where $a_0$ is the Least Significant Bit (LSB) and $a_{A_c-1}$ is the Most Significant Bit (MSB) and where a bit value of zero indicates that the PMI and RI reporting is not allowed to correspond to precoder(s) associated with the bit, i.e. the particular bit related to the bit value of zero. The associations of bits to precoders for the relevant transmission modes are given as follows in table 1:

TABLE 1

Number of bits in codebook subset restriction bitmap for applicable transmission modes.

| | | Number of bits $A_c$ | | |
|---|---|---|---|---|
| | | 2 antenna ports | 4 antenna ports | 8 antenna ports |
| Transmission mode | Open-loop spatial multiplexing (TM3) | 2 | 4 | — |
| | Closed-loop spatial multiplexing (TM4) | 6 | 64 | — |
| | Multi-user MIMO (TM5) | 4 | 16 | — |
| | Closed-loop rank = 1 precoding (TM6) | 4 | 16 | — |
| | Closed-loop spatial multiplexing with CSI-RS and DM-RS (TM9 and 10) | 6 | 96 | 109 |

As can be seen in table 1, the higher the number of layers, which may also be referred to as the Rank, the more bits are needed for codebook subset restriction. The layers correspond to the number of antennas at the radio access node or at the network device, such as a UE. For transmission mode 9 & 10 with 8 layer transmission, e.g. a 96 bits are needed. Hence, if the network node would send the same number of bits to all network devices, such as e.g. 96 bits, the signaling overhead to a UE only supporting 64 bits would be unnecessary large.

In HSPA: According to 3GPP standard TS Physical layer procedures 25.214 v13.0.0, a network device, which may also be referred to as a UE, may be restricted to report a Precoding Control Index (PCI), and a Number of Transport Blocks Preferred (NTBP) within a precoder codebook subset specified by a bitmap parameter. This bitmap parameter may be referred to as PrecodingWeightRestriction, and may be configured by higher layer signalling. The bitmap may specify all possible precoder codebook subsets from which the UE may assume the Node B may be using when the UE is configured in MIMO mode with four transmit antennas. In other words, the bitmap specifies the precoder codebook subsets that a network node, such as a radio access node, might use for communication with the network device, such as the UE. The bitmap may form a bit sequence $a_{63}, \ldots, a_3, a_2, a_1, a_0$ where $a_0$ is the Least Significant Bit (LSB) and $a_{63}$ is the Most Significant Bit (MSB) and where a bit value of zero indicates that the precoding indices reporting is not allowed in the NTBP/PCI/CQI report. Note that a similar procedure may be used for 2 transmit (Tx) antennas.

Applications of Codebook Subset restriction: There are many applications of codebook subset restriction. In some embodiments herein the codebook subset restriction may for example be used to reduce the computational complexity at the UE side during PMI/RI search from the network etc. In this case, the network may need to send an RRC reconfiguration message with different bit maps. Herein, the different bit maps shall be interpreted as bit maps which differ from the bit maps previously known at the UE side.

Using codebook subset restriction, the network node, such as a Node B or an eNode B, may send a bit map dynamically through RRC signaling or higher order signaling by using only a subset of codebook elements. However, in current communication systems, the network node sends the bit map equal in length to all the UEs. When the number of transmit antennas increases, the bitmap size increases correspondingly and may become huge. Hence, a large signaling overhead, needs to be conveyed to the UE through higher layer signaling, whenever the network node needs to configure and/or reconfigure and/or setup the UE with codebook subset restriction. Hence efficient techniques are needed to convey the bitmap to the UE without causing much overhead.

Figure 1:
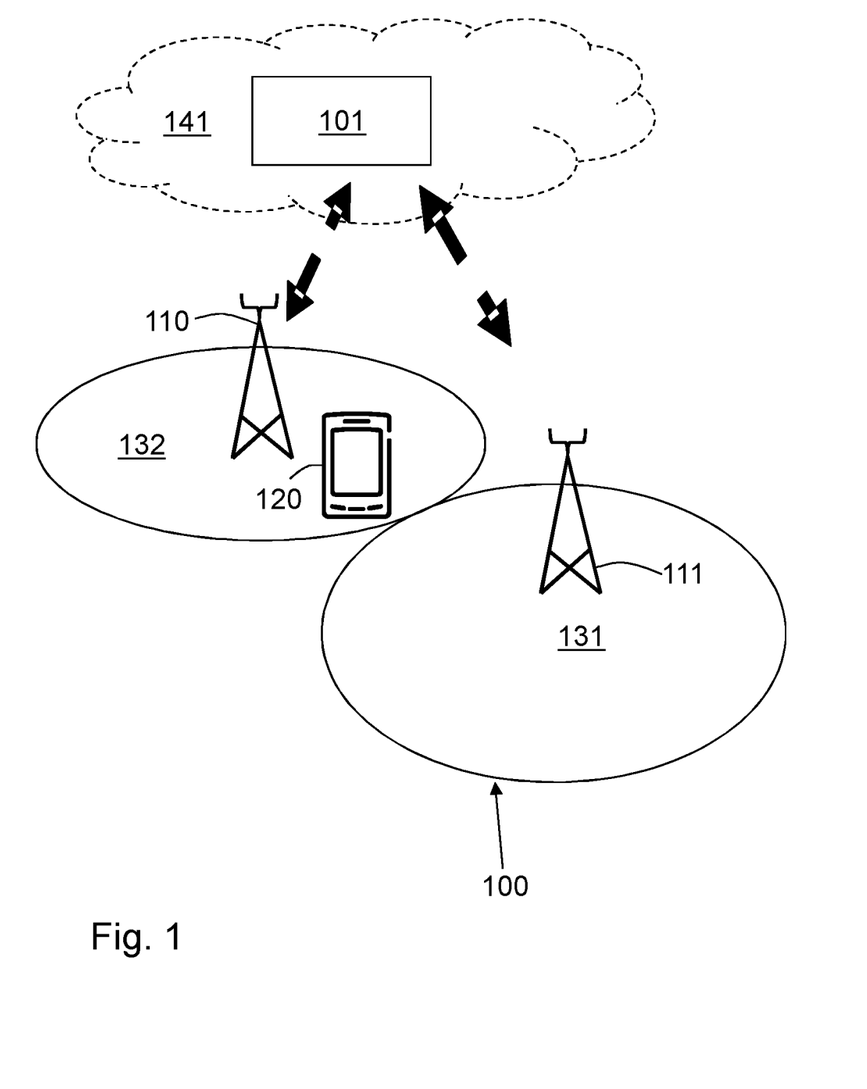
FIG. 1 is a schematic block diagram illustrating embodiments of a communications network.

FIG. 1 depicts an example of a heterogeneous deployment of a communications network 100 adapted to wirelessly serve a UE 120 according to a first scenario in which embodiments herein may be implemented. The communications network 100 may be a wireless communication network such as an LTE, E-Utran, WCDMA, GSM network, any 3GPP cellular network, Wimax, or any cellular network or system.

The communications network 100 comprises a plurality of radio access (RA) nodes whereof two, a first RA node 110 and a second RA node 111 are depicted in FIG. 1. The first RA node 110 and the second RA node 111 are network nodes which each may be a transmission point such as a radio base station, for example an eNB, an eNodeB, or an Home Node B, an Home eNode B or any other network node capable to wirelessly serve a wireless terminal such as a user equipment or a machine type communication device in a wireless communications network. The first RA node 110 and the second RA node 111 each serves a cell 131, 132.

The communication network 100 further comprises a network node 101 which is configured to communicate with at least one RA node 110, 111. The network node 101 may be a distributed node where the functionality is comprised in a first cloud 141. The network node 101 and the functionality of the network node 101 may however also be comprised in or comprise one of the RA nodes 110, 111.

The wireless communications network 100 comprises a network device 120. The first RA node 110 and the second RA node 111 may each be a transmission point for the UE 120. The UE 120 is within radio range of the first RA node 110 and the second RA node 111, this means that it can hear signals from the first RA node 110 and the second RA node 111.

The network device 120 may e.g. be a User Equipment (UE), a wireless terminal, a wireless device, a mobile wireless terminal or a wireless terminal, a mobile phone, a computer such as e.g. a laptop, a Personal Digital Assistant (PDA) or a tablet computer, sometimes referred to as a surf plate, with wireless capability, or any other radio network units capable to communicate over a radio link in a wireless communications network. Please note the term wireless terminal used in this document also covers other wireless devices such as Machine to machine (M2M) devices.

Table 2 shows the supported UE categories, the maximum number of block bits received during a TTI and the number of supported layers for each UE category. Each UE category may support a number of layer, such as e.g. 1, 2, 4 or 8 layers, and some may support both 2 and 4 layers as indicated in the last column. Based on the number of layers that the UE supports and sends to the network node, the network node may decide the codebook subset restriction. The network node may map the layers to the corresponding bit map and then send the corresponding bits to the UE.

Categories 6, 7, 9 and 10 supports both 4 layers and 2 layers, which is indicated to the network node by means of the capability. Hence, the network may first check the category and the capability of the network device and then decide whether to send 32 bits as codebook subset restriction, which corresponds to 2 layers, or 64 bits as codebook subset restriction, which corresponds to 4 layers. Note, that 32 bits length for 2 layers and 64 bits length for 4 layers relate to a conventional codebook. If another codebook is used, these values may change. However, the concept described in the embodiments herein may be applied to any number of bits.

TABLE 2

Supported network device, which may also be referred to as UE, categories

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 9 | 452256 | 149776 (4 layers) 75376 (2 layers) | 5481216 | 2 or 4 |
| Category 10 | 452256 | 149776 (4 layers) 75376 (2 layers) | 5481216 | 2 or 4 |

In the embodiments disclosed herein, the network node 101, such as e.g. a Node B, an eNodeB or an RNC, may configure the network device 120, such as a UE, with the codebook subset restriction based on a received UE category and/or UE capability. For example, in a scenario were the transmitter comprises 4 transmit (Tx) antennas. According to current systems the network node comprising 4 Tx antennas always sends a bit map length equal to 64 bits to the network device, regardless of the network devices 120 capability. However, based on the UE category and/or the capability, some UEs do not support more than rank 2, which may also be referred to as only supporting 2 transmit antennas or 2 layers for spatial multiplexing. For these UEs, only 32 bits are needed rather than the 64 bits sent by the network node 101. Hence, the network node 101 may send 32 bits for codebook subset restriction for these UEs and 64 bits for the UEs which can support up to rank 4.

By only sending 32 bits instead of 64 bits to these UEs 120, the signaling overhead may be reduced.

Figure 2:
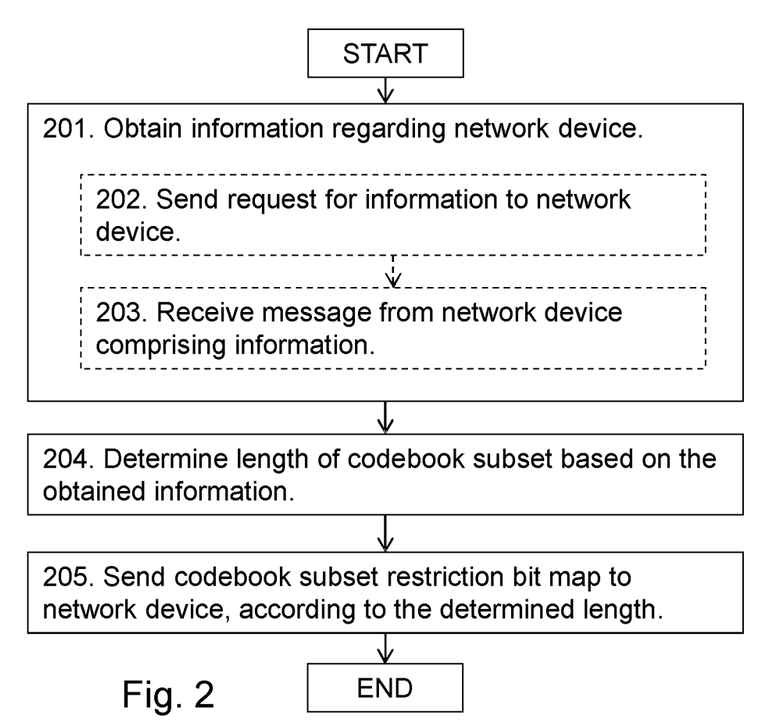
FIG. 2 is a flowchart depicting embodiments of a method in a network node.

Example of embodiments of a method in the network node 101 for reducing a higher layer signaling overhead in multi antenna wireless communication systems, will now be described with reference to a flowchart depicted in FIG. 2. The network node 101 may operate in a communication network, which network may be adapted to wirelessly serve a User Equipment (UE) 120 via a Radio Access (RA) node 110. The method comprises the following actions, which actions may be taken in any suitable order. Dashed lines of a box in FIG. 2 indicate that this action is not mandatory.

Action 201

The network node 101 may obtain information from a network device 120, which information comprises a category of the network device 120 and/or a number of layers supported for spatial multiplexing.

Action 202

In some embodiments, in order to obtain the information, the network node 101 may send a request for information about a category of a network device 120, such as a UE, and/or a number of layers supported by the network device 120. The request may be sent to the network device 120. The network node 101 may either request the information directly from the network device 120 or may send the request to the network device 120 via a radio access node 110.

Action 203

The network node 101 may further receive a message from the network device 120, comprising the requested information in order to obtain the information about the network device 120.

In some embodiments herein, in order to obtain the information, the network node 101 may receive a message from the network device 120 comprising the requested information. This message may be received as a response to the request sent in Action 202.

The information may however also be sent to the network node 101 from the network device 120 during cell set up, without the network node 101 sending a request to the network device 120 for the information.

Action 204

The network node 101 may further determine a length of a codebook subset restriction based on the information obtained from the network device. For network devices supporting a lower number of layers than the number of transmit antennas of the network node, the network node may send a reduced bit map comprising the number of bits supported by the network device 120 in order to restrict the codebook subset. For the scenario described above with a network node comprising 4 Tx antennas, the network node 101 may determine the length of the codebook subset restriction to be 32 bits for UEs only supporting 2 layers for spatial multiplexing in the downlink.

For network devices 120 in categories supporting the same number of layers for spatial multiplexing in DL as the number of Tx antennas of the network node 101, the network node 101 may send the full number of bits of the length of the codebook subset restriction to the network device. For the scenario described above, the 4 TX antennas of the network node 101 corresponds to 64 bits as codebook subset restriction. Hence, the network node 101 determines the length of the codebook subset restriction for network devices 120 supporting all 4 layers to be 64 bits.

For network devices 120 supporting one or more set of layers for spatial multiplexing in DL, such as e.g. network devices 120 in categories 6, 7, 9 and 10 according to table 1 which support both 2 and 4 layers, the network node 101 may decide whether to send a reduced codebook subset restriction or a full codebook subset restriction. For the scenario described above, the reduced codebook subset restriction corresponds to a 32 bit codebook subset restriction and the full codebook subset restriction would correspond to a 64 bit codebook subset restriction.

Hence, the network node 101 may send a reduced bit map of the codebook subset restriction comprising the number of bits supported by the network device 120 in order to reduce the signaling overhead from an upper layer.

Action 205

The network node 101 may further send a codebook subset restriction bit map to the network device 120, according to the determined length of the codebook subset restriction. The codebook subset restriction bit map may be sent to the network device 120 in a message.

In some embodiments, the network node 101 may send the codebook subset restriction bit map to the network device 120 in an RRC configuration message. In case a reduced codebook subset restriction is used the overhead of the message may also be reduced.

In further embodiments herein, the network node may send the codebook subset restriction bit map to the network device 120 in an RRC Re-configuration message.

Figure 3:
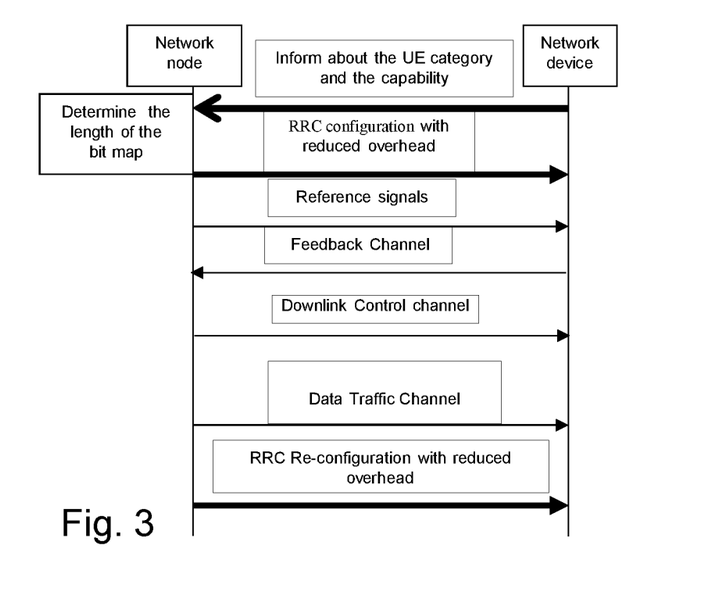
FIG. 3 is a message sequence chart depicting embodiments of the messaging between network node and network device.

FIG. 3 shows a messaging sequence chart of embodiments of the method disclosed herein for a 3GPP LTE network. The network device, such as the UE, may inform the network node about its category and the capability of the number of supported layers for spatial multiplexing in DL to the network during a cell set up, during an RRC connection setup or as a response to a network device capability enquiry sent by the network node to the network device asking the network device to send its capability. The network node then determines the length of the codebook subset restriction bit map and sends the codebook subset restriction bit map to the network device using either an RRC configuration message during an RRC connection setup procedure or using an RRC Re-configuration message if the codebook subset restriction is changed at a later stage.

For HSPA networks, the same principle may be applied, however the Node B may indicate the decision to the RNC and the RNC decides about the bit map length. Thereby the signaling over Iub/Iur interfaces may also be reduced.

Figure 4:
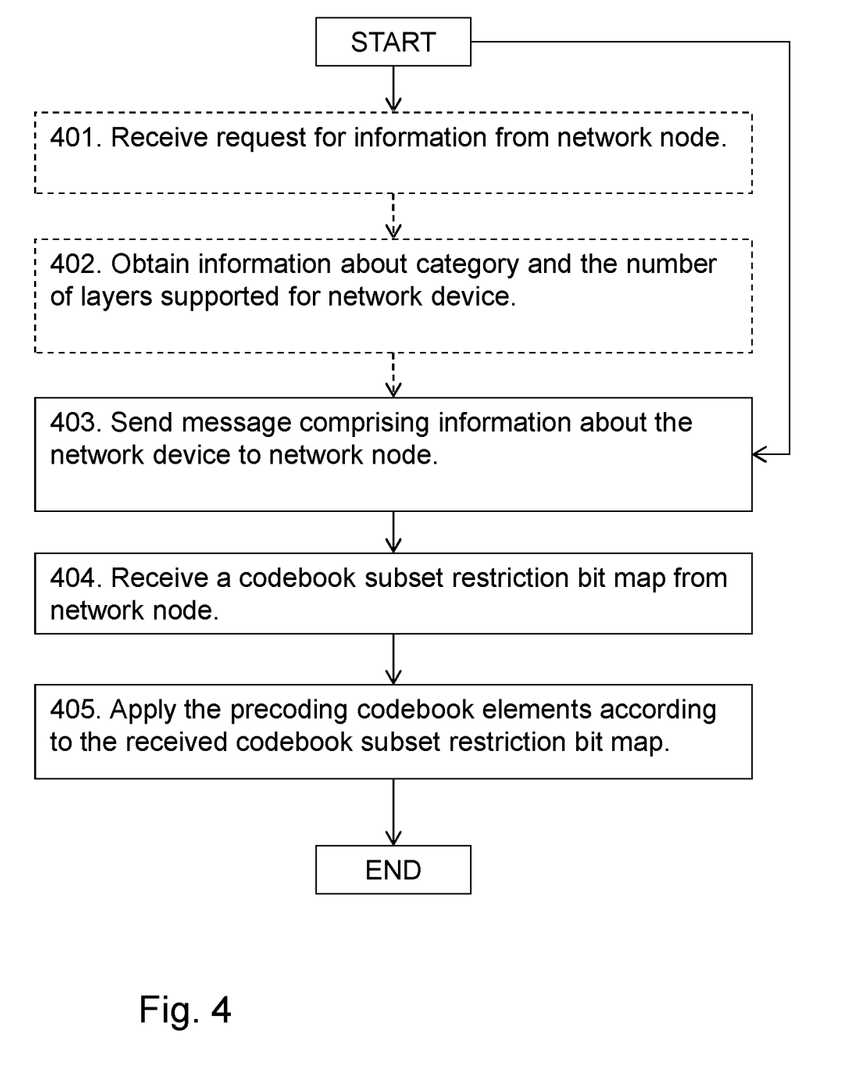
FIG. 4 is a flowchart depicting embodiments of a method in a network device.

Example of embodiments of a method in the network device 120 for reducing a higher layer signaling overhead in multi antenna wireless communication systems, will now be described with reference to a flowchart depicted in FIG. 4. The network device 120 may operate in a communication network, which network may be adapted to wirelessly serve a User Equipment (UE) via a Radio Access (RA) node. The method comprises the following actions, which actions may be taken in any suitable order. Dashed lines of a box in FIG. 4 indicate that this action is not mandatory.

Action 401

In some embodiments herein, the network device 120 may receive a request from the network node 101 for information about the network device's 120 category and the number of layers supported by the network device 120. This action 401 may be performed by means of a receiving module comprised in the network device 120.

Action 402

The network device 120 may further obtain the information about its category and the number of layers it supports. This action 402 may be performed by means of an obtaining module comprised in the network device 120.

The information may e.g. be stored in the network device 120, such as e.g. in a memory and/or in a Subscriber Identity Module (SIM). The obtaining may e.g. be performed by retrieving the stored information from the memory and/or from the SIM.

Action 403

The network device 120 may send a message to the network node 101 comprising information about the network device's 120 category and the number of layers supported by the network device 120. This action 403 may be performed by means of a sending module comprised in the network device 120.

Action 404

The network device 120 may further receive a codebook subset restriction bit map from the network node 101.

In some embodiments herein, the network device 120 may receive the codebook subset restriction bit map from the network node 101 in any type of configuration message, which message initiates a configuration of the network device.

In some embodiments herein, the network device 120 may receive the codebook subset restriction bit map from the network node 101 in an RRC configuration message.

In further embodiments herein, the network device 120 may receive the codebook subset restriction bit map from the network node 101 in an RRC Re-configuration message. This action 404 may be performed by means of a receiving module comprised in the network device 120.

Action 405

The network device 120 may further apply, which may also be referred to as configure itself using, the precoding codebook elements for CSI reporting according to the codebook subset restriction bit map received from the network node 101. This action 405 may be performed by means of an application module, which may also be referred to as a configuration module, being comprised in the network device 120.

Figure 5:
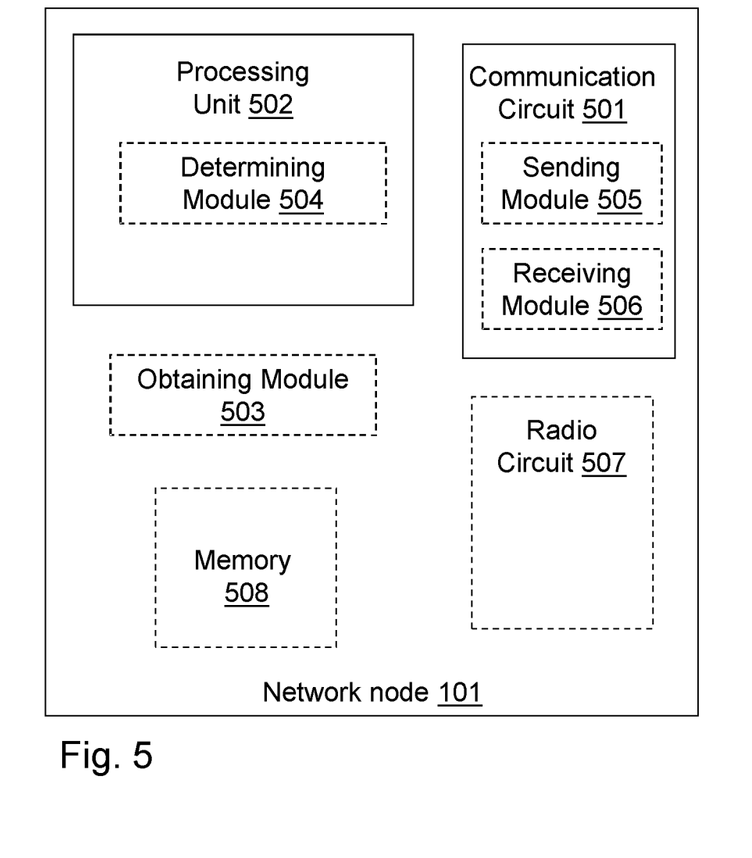
FIG. 5 is a schematic block diagram illustrating embodiments of a network node.

To perform the method actions for reducing a higher layer signaling overhead in multi antenna wireless communication systems in a communications network 100 described above in relation to FIG. 2, the network node 101 may comprise the following arrangement depicted in FIG. 5. As mentioned above the network node 101 operates in a communication network 100, which comprises at least one RA node 110 associated with one or more cells.

The network node 101 comprises a communication circuitry 501 to communicate with other network nodes, such as e.g. RA nodes 110, 111 and a processing unit 502.

The network node 101 is configured to, e.g. by means of an obtaining module 503 being configured to, obtain information from a network device 120, which information comprises the category of the network device 120 and/or a number of layers supported for spatial multiplexing.

The network node 101 is further configured to, e.g. by means of a determining module 504 being configured to, determine a length of a codebook subset restriction based on the information obtained from the network device 120. The determining module 504 may be comprised in the processing unit 502.

The network node 101 is further configured to, e.g. by means of a sending module 505 being configured to, send a codebook subset restriction bit map to the network device 120, according to the determined length of the codebook subset restriction.

The network node 101 may further be configured to, e.g. by means of a receiving module 506 being configured to, receiving a message from the network device 120 comprising the requested information in order to obtain the information about the network device 120.

The network node 101 may further be configured to, e.g. by means of the sending module 504 being configured to, send a request for information about the category of a network device 120, such as a UE, and/or a number of layers supported by the network device 120.

In some embodiments herein the network node 101 may be a distributed node, e.g. comprised in a cloud. The distributed node being configured to communicate with one or more RA nodes 110, 111, by means of the communication circuit 501.

In some further embodiments herein, the network node 101 may be implemented together with the serving RA node 110. This may e.g. be implemented by the network node 101 being comprised in the RA node 110 or the RA node 110 being comprised in the network node 101. In this embodiment the network node 101 may further comprise a radio circuitry 507 to communicate with UEs 120.

The embodiments disclosed herein for reducing a higher layer signaling overhead in multi antenna wireless communication systems may be implemented through one or more processors, such as the processing unit 502 in the network node 101 depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the network node 101. One such carrier may be in the form of a CD ROM disc. It is however feasible with other data carriers such as a memory stick. The computer program code may furthermore be provided as pure program code on a server and downloaded to the network node 101.

The network node 101 may further comprise a memory 508 comprising one or more memory units. The memory 408 may be arranged to be used to store obtained information, measurements, data, configurations, schedulings, and applications to perform the methods herein when being executed in the network node 101. This may also apply in a corresponding manner to the network device 120.

Those skilled in the art will also appreciate that the obtaining module 503 and the determining module 504 described above may refer to a combination of analog and digital circuits, and/or one or more processors configured with software and/or firmware, e.g. stored in the memory 508, that when executed by the one or more processors such as the processing unit 502 performs the actions as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC). This may also apply in a corresponding manner to the network device 120.

Figure 6:
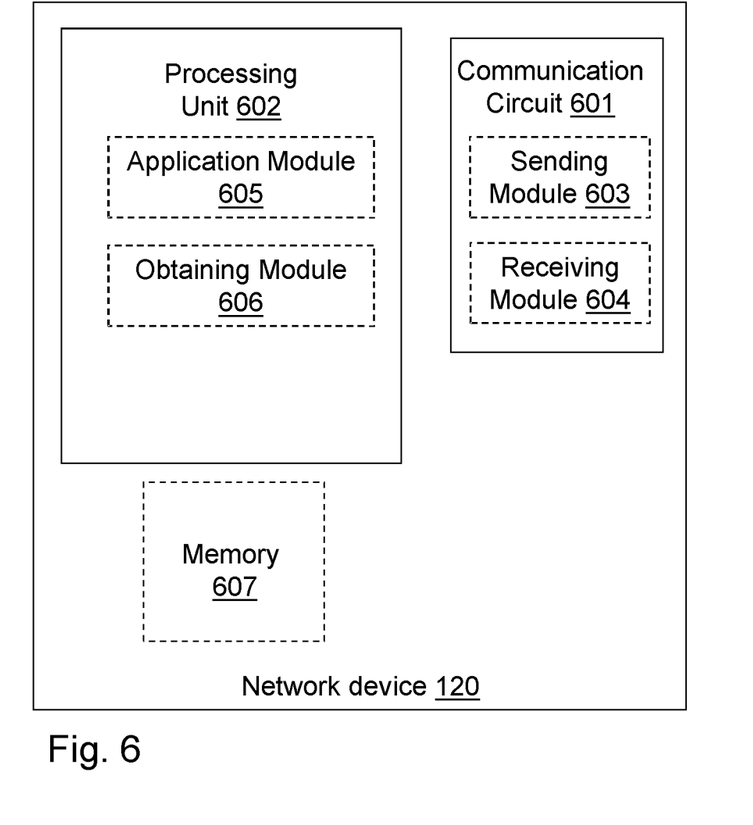
FIG. 6 is a schematic block diagram illustrating embodiments of a network device.

To perform the method actions for reducing a higher layer signaling overhead in multi antenna wireless communication systems in a communications network 100 described above in relation to FIG. 4, the network device 120 may comprise the following arrangement depicted in FIG. 6. As mentioned above the network device 120 operates in a communication network 100, which comprises at least one RA node 110 associated with one or more cells.

The network device 120 comprises a communication circuitry 601 for communicating with network nodes, such as e.g. RA nodes 110, 111, and a processing unit 602.

The network device 120 is configured to, e.g. by means of a sending module 603 and/or the processing unit 602 being configured to, send a message to the network node 101 comprising information about the category of the network device 120 and the number of layers supported by the network device 120.

The network device 120 is configured to, e.g. by means of a receiving module 604 and/or the processing unit 602 being configured to, receive a codebook subset restriction bit map from the network node 101. In some embodiments herein, the network device 120 may be configured to receive the codebook subset restriction bit map from the network node 101 in any type of configuration message, which message initiates a configuration of the network device 120. In some embodiments herein, the network device 120 may be configured to receive the codebook subset restriction bit map from the network node 101 in an RRC configuration message. In further embodiments herein, the network device 120 may be configured to receive the codebook subset restriction bit map from the network node 101 in an RRC Re-configuration message.

The network device 120 may further be configured to, e.g. by means of an application module 605 and/or the processing unit 602 being configured to, apply, which may also be referred to as configure itself using, the precoding codebook elements for CSI reporting according to the codebook subset restriction bit map received from the network node 101. The application module 604, may also be referred to as a configuration module.

The network device 120 may further be configured to, e.g. by means of the receiving module 604 and/or the processing unit 602 being configured to, receive a request from the network node 101 for information about the network device's 120 category and the number of layers supported by the network device 120.

The network device 120 may be configured to, e.g. by means of an obtaining module 606 and/or the processing unit 602 being configured to, obtain information about its category and the number of layers it supports.

The embodiments disclosed herein for reducing a higher layer signaling overhead in multi antenna wireless communication systems may be implemented through one or more processors, such as the processing unit 602 in the network device 120 depicted in FIG. 6, together with computer program code for performing the functions and actions of the embodiments herein. The program code mentioned above may also be provided as a computer program product, for instance in the form of a data carrier carrying computer program code for performing the embodiments herein when being loaded into the network device 120. One such carrier may be in the form of a CD ROM disc. It is however feasible with other data carriers such as a memory stick. The computer program code may furthermore be provided as pure program code on a server and downloaded to the network device 120.

The network device 120 may further comprise a memory 607 comprising one or more memory units. The memory 607 may be arranged to be used to store obtained information, measurements, data, configurations, schedulings, and applications to perform the methods herein when being executed in the network device 120.

Those skilled in the art will also appreciate that the obtaining module 606 and the application module 605 described above may refer to a combination of analog and digital circuits, and/or one or more processors configured with software and/or firmware, e.g. stored in the memory 607, that when executed by the one or more processors such as the processing unit 602 performs the actions as described above. One or more of these processors, as well as the other digital hardware, may be included in a single Application- Specific Integrated Circuitry (ASIC), or several processors and various digital hardware may be distributed among several separate components, whether individually packaged or assembled into a system-on-a-chip (SoC).

The embodiments herein concern 4×4 and 2×2 MIMO systems, they are however equally applicable for any $N_1$ TX systems. The embodiments are also applicable for 1D codebooks as well as for any other and/or future codebooks, such as e.g. the new 2D codebooks under consideration in 3GPP.

The embodiments herein are described in particular for MIMO operation E-UTRA/LTE/LTE-A, UTRA/HSPA FDD systems. The embodiments herein are however also applicable to any RAT or multi-RAT system where the UE operates using MIMO, such as e.g. LTE TDD, GSM/GERAN, Wi Fi, WLAN, WiMax, CDMA2000, LTE-NX, Massive MIMO systems etc.

The embodiments herein are applicable to single carrier as well as to multicarrier (MC) or carrier aggregation (CA) operation of the UE in conjunction with MIMO, in which the UE is able to receive and/or transmit data to more than one serving cells using MIMO. The term carrier aggregation (CA) may also be interchangeably referred to as e.g. multicarrier system, multi-cell operation, multi-carrier operation and/or multi-carrier transmission and/or reception.

Please note that in embodiments herein, the term precoding weight restriction and codebook subset restriction may be used interchangeably. Furthermore, the embodiments herein, focus on wireless transmissions in the downlink. However, the embodiments described herein may also be equally applicable in the uplink.

In this section, the embodiments herein will be illustrated in more detail by a number of exemplary embodiments. It should be noted that these embodiments are not mutually exclusive. Components from one embodiment may be tacitly assumed to be present in another embodiment and it will be obvious to a person skilled in the art how those components may be used in the other exemplary embodiments.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method, performed by a network node, for reducing a higher layer signaling overhead in multi antenna wireless communication systems, wherein the network node operates in a communication network, which communication network is adapted to wirelessly serve a network device via a Radio Access (RA) node, wherein the method comprises:
   obtaining information from the network device, which information comprises a category of the network device and a number of layers supported by the network device,
   determining a length of a codebook subset restriction based on the category of the network device and the number of layers supported by the network device, obtained from the network device, and
   sending a codebook subset restriction bit map to the network device, according to the determined length of the codebook subset restriction.

2. The method according to claim 1, wherein the obtaining comprises:
   receiving a message from the network device comprising the information to be obtained.

3. The method according to claim 1, wherein the obtaining further comprises:
   sending, to the network device, a request for information about the category of a network device, and/or a number of layers supported by the network device.

4. The method according to claim 3, wherein the request for information is sent directly to the network device.

5. The method according to claim 3, wherein the request for information is sent to the network device via a radio access node.

6. The method according to claim 1, wherein, when the network device supports a lower number of layers than the number of transmit antennas of the radio access node, the network node sends a reduced bit map of the codebook subset restriction comprising the number of bits supported by the network device in order to reduce the signaling overhead from an upper layer.

7. The method according to claim 1, wherein, when the network device supports the same number of layers for spatial multiplexing in downlink (DL) as the number of transmit antennas of the radio access node, the network node may send the full number of bits of the length of the codebook subset restriction to the network device.

8. The method according to claim 1, wherein, when the network device supports one or more set of layers for spatial multiplexing in DL, the network node may decide to send a reduced codebook subset restriction or a full codebook subset restriction to the network device.

9. A method, performed by a network device, for reducing a higher layer signaling overhead in multi antenna wireless communication systems, wherein the network device operates in a communication network, which communication network is adapted to wirelessly serve the network device via a Radio Access (RA) node, wherein the method comprises:
   sending a message to the network node comprising information about the category of the network device and the number of layers supported by the network device,
   receiving a codebook subset restriction bit map from the network node, according to a length of the codebook subset restriction determined based on the sent category of the network device and the number of layers supported by the network device,
   applying the precoding codebook elements for Channel State Information (CSI) reporting according to the codebook subset restriction bit map received from the network node.

10. The method according to claim 9, wherein the method further comprises:
    receiving from the network node, a request for information about the category of the network device, and/or a number of layers supported by the network device.

11. The method according to claim 9, wherein the method further comprises:
    obtaining the information about the category and the number of layers the network device supports.

12. A network node configured to perform a method for reducing a higher layer signaling overhead in multi antenna wireless communication systems, wherein the network node operates in a communication network, which communication network is adapted to wirelessly serve a network device via a Radio Access (RA) node, wherein the network node is configured to:

obtain information from the network device, which information comprises a category of the network device and a number of layers supported by the network device, determine a length of a codebook subset restriction based on the category of the network device and the number of layers supported by the network device, obtained from the network device, and send a codebook subset restriction bit map to the network device according to the determined length of the codebook subset restriction.

13. The network node according to claim 12, wherein the network node is further configured to:

receive a message from the network device comprising the information to be obtained.

14. The network node according to claim 12, wherein the network node is further configured to:

send, to the network device, a request for information about the category of a network device, and/or a number of layers supported by the network device.

15. A network device configured to perform a method for reducing a higher layer signaling overhead in multi antenna wireless communication systems, wherein the network device operates in a communication network, which communication network is adapted to wirelessly serve the network device via a Radio Access (RA) node, wherein the network device is configured to:

send a message to the network node comprising information about the category of the network device and the number of layers supported by the network device, receive a codebook subset restriction bit map from the network node, according to a length of the codebook subset restriction determined based on the sent category of the network device and the number of layers supported by the network device, and apply the precoding codebook elements for Channel State Information (CSI) reporting according to the codebook subset restriction bit map received from the network node.

16. The network device according to claim 15, wherein the network device is further configured to:

receive, from the network node, a request for information about the category of the network device, and/or a number of layers supported by the network device.

* * * * *